(12) United States Patent
Wu et al.

(10) Patent No.: US 6,285,775 B1
(45) Date of Patent: Sep. 4, 2001

(54) WATERMARKING SCHEME FOR IMAGE AUTHENTICATION

(75) Inventors: Min Wu; Bede Liu, both of Princeton, NJ (US)

(73) Assignee: The Trustees of the University of Princeton, Princeton, NJ (US)

(*) Notice: Subject to any disclaimer, the term of this patent is extended or adjusted under 35 U.S.C. 154(b) by 0 days.

(21) Appl. No.: 09/164,474

(22) Filed: Oct. 1, 1998

(51) Int. Cl.$^7$ ..................................................... G06K 9/00
(52) U.S. Cl. ........................................................ 382/100
(58) Field of Search .................................. 382/100, 232; 380/28, 29, 30, 54; 705/51

(56) References Cited

U.S. PATENT DOCUMENTS

| | | | |
|---|---|---|---|
| 5,530,759 | * 6/1996 | Braudaway et al. | 380/54 |
| 5,721,788 | 2/1998 | Powell | 382/100 |
| 5,778,102 | * 7/1998 | Standford, II et al. | 382/251 |
| 5,875,249 | 2/1999 | Mintzer et al. | 380/54 |
| 5,930,369 | * 7/1999 | Cox et al. | 380/54 |
| 5,960,081 | * 9/1999 | Vynne et al. | 713/176 |
| 6,061,793 | * 5/2000 | Tewfik et al. | 713/176 |

OTHER PUBLICATIONS

BYTE Magazine, "How to Embed a Watermark", Jan. 1997, 1 page (http://www.byte.com/art/970/sec18/art3.htm).

Ahumada, Jr., "Luminance–Model–Based DCT Quantization for Color Image Compression", *SPIE Human Vision, Visual Processing, and Digital Display III*, 1992, 1666, 365–374.

Friedman, G.L., "The trustworthy Digital Camera: Restoring Credibility to the Photographic Image", *IEEE Trans. on Consumer Electronics*, Nov. 1993, 39(4), 905–910.

Kesavan, H., "EE 392c Autumn 1997 Final Project: Choosing a DCT Quantization Matrix for JPEG Encoding", http://www–ise.stanford.edu/class/ee392c/demos/kesavan, Jul. 1998, 5 pages.

Koch, E. et al., "Towards Robust and Hidden Image Copyright Labeling", *IEEE Workshop on Nonlinear Signal and Image Processing*, 1995, 1–4.

(List continued on next page.)

Primary Examiner—Andrew W. Johns
Assistant Examiner—Shervin Nakhjavan
(74) Attorney, Agent, or Firm—Woodcock Washburn Kurtz Mackiewicz & Norris LLP

(57) ABSTRACT

A digital watermarking process whereby an invisible watermark inserted into a host image is utilized to determine whether or not the image has been altered and, if so, where in the image such alteration occurred. The watermarking method includes the steps of providing a look-up table containing a plurality of coefficients and corresponding values; transforming the image into a plurality of blocks, wherein each block contains coefficients matching coefficients in the look-up table; and embedding the watermark in the image by performing the following substeps for at least some of the blocks: First, a coefficient is selected for insertion of a marking value representative of a corresponding portion of the watermark. Next, the value of the selected coefficient to used to identify a corresponding value in the look-up table. Finally, the identified coefficient is left unchanged if the corresponding value is the same as the marking value, and is changed if the corresponding value is different from the marking value. After the insertion of the watermark, the image may be stored in a lossy-compression form, thus permitting efficient storage and distribution. Moreover, the method may be used to produce two output signals for authentication: (1) a meaningful pattern to facilitate a quick visual check, and (2) an additional signal to detect unauthorized alteration. The method can be applied to an image compressed using JPEG or other techniques, such as Wavelet compression, and the marked image can be kept in the compressed format. Any alteration made on the marked image can be localized, making the method suitable for use in a "trustworthy" digital camera or camcorder.

14 Claims, 13 Drawing Sheets

OTHER PUBLICATIONS

Mintzer, F. et al., "Effective and Ineffective Digital Watermarks", *ICIP*, 1997, vol. 3, 4 pages.

Richter, J., "The Digital Watermark", http://www.richterscale.org/pcgr/pc960220.htm, May 1998, 3 pages.

Schneidner, M. et al., "A Robust Content Based Digital Signature for Image Authentication", *IEEE*, 1996, 227–230.

Storck, D., "A New Approach to Integrity of Digital Images", *IFIP Conf. on Mobile Communication*, 1996, 8 pages.

Swanson, M.D. et al., "Robust Data Hiding for Images", *IEEE Digital Signal Processing Workshop*, Sep. 1996, 37–40.

Wallace, G.K., "The JPEG Still Picture Compression Standard", *IEEE Trans. on Consumer Electronics*, 1991, 1–17.

Yeung, M.M. et al., "An Invisible Watermarking Technique for Image Verification", *ICIP*, 1997, vol. 2, 4 pages, Zeng, W, et al., "On Resolving Rightful Ownerships of Digital Images by Invisible Watermarks", *ICIP*, 1997, 4 pages.

Zhao, J., "Digital watermarking is the best way to protect intellectual property from illicit copying", (http://www.byte.com/art/9701/sec18/art1.htm), May 1998, 5 pages.

* cited by examiner

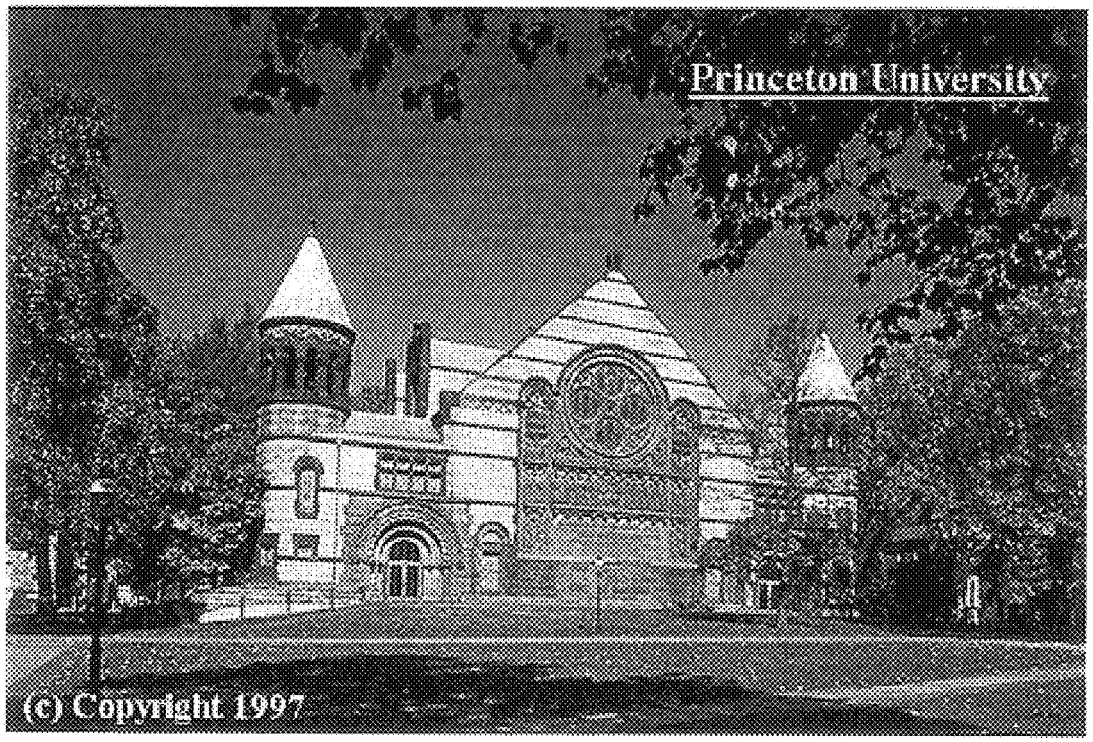
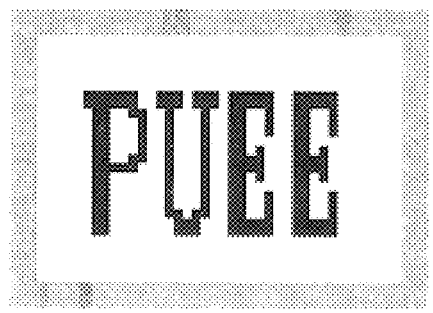
FIG. 2B

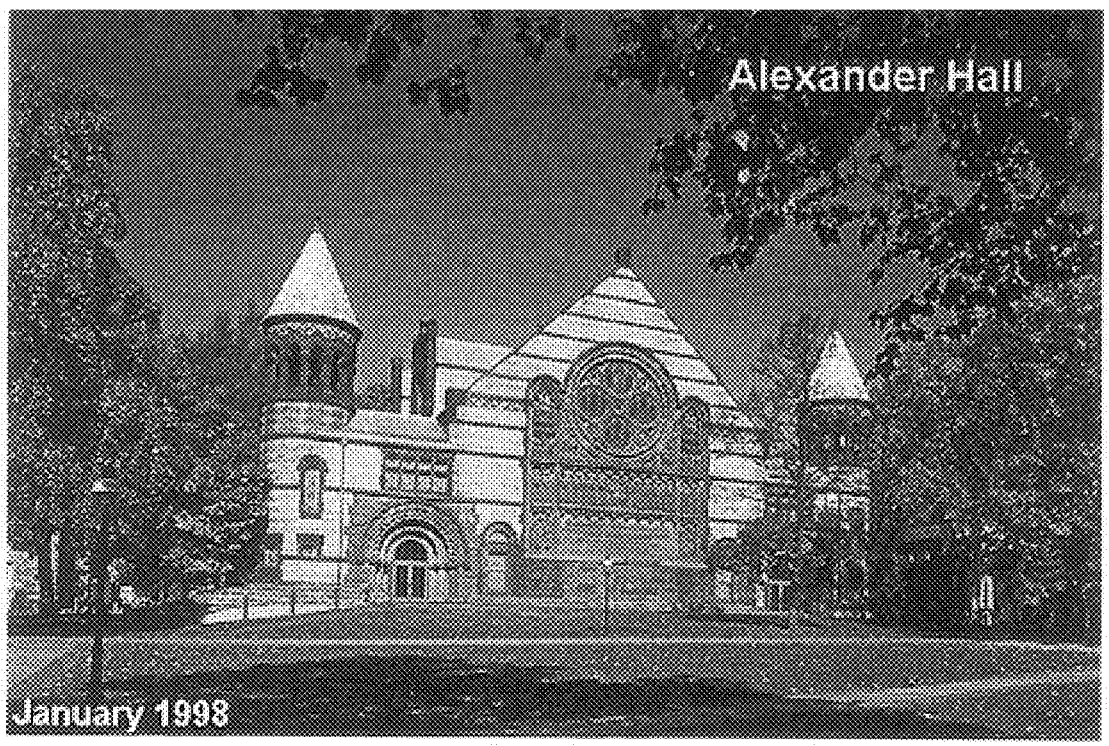
FIG. 2C

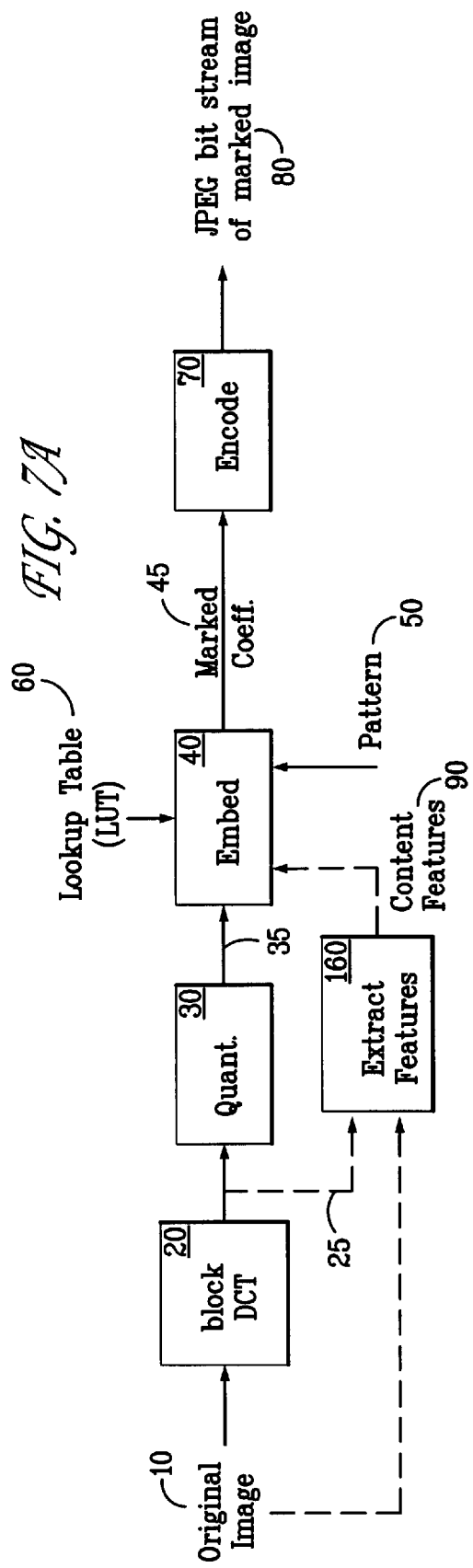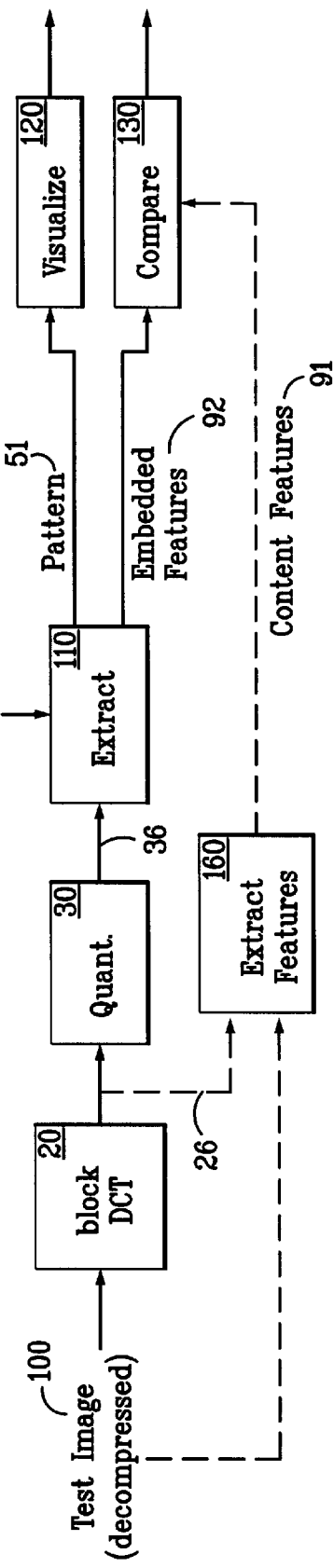

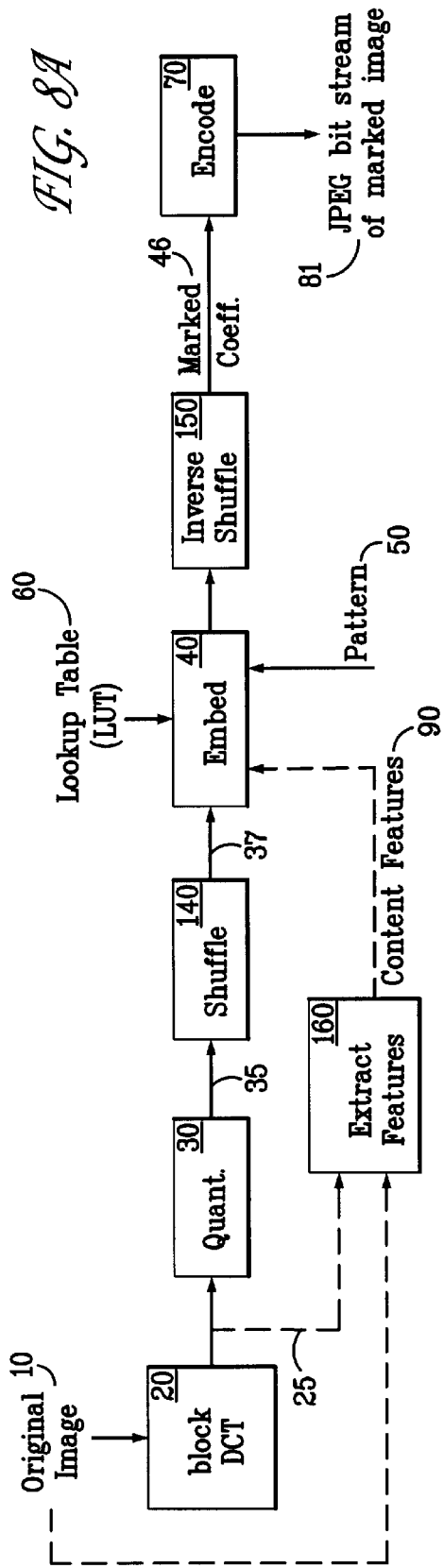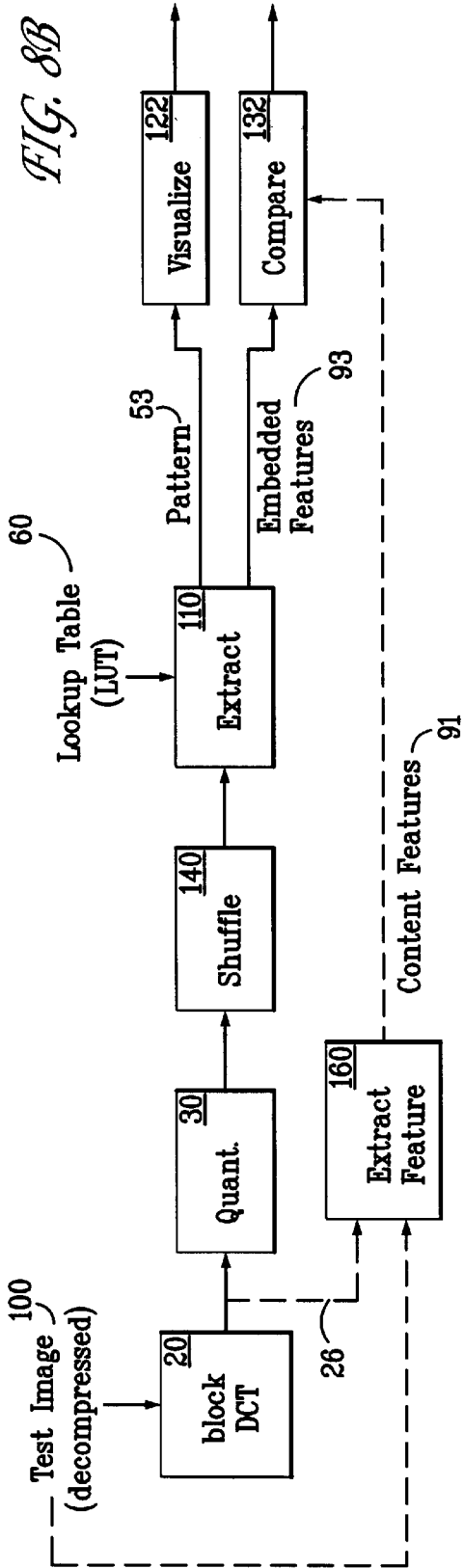

WATERMARKING SCHEME FOR IMAGE AUTHENTICATION

I. FIELD OF THE INVENTION

The present invention concerns a new method and system for watermarking digital images for authentication purposes.

II. BACKGROUND OF THE INVENTION

A black-white or grey scale image of size X×Y can be described by its brightness in a plane, i.e., by a function f(x,y) where f is the brightness at a point with coordinates (x,y). A digital grey scale image comprises pixels arranged in a raster. Such an image can be described by f(i,j) where the brightness f takes on a value from a discrete set of values called quantized values, and (i,j) is a pair of integers. An example is a digital image of 512×512 pixels and each pixel takes on an integer value between 0 and 255. In this specification, an image shall mean a digital image unless otherwise noted.

A common way to represent the pixels of a digital color image is to use 3 numbers denoting the red component, green component, and blue component. In this way, the image is represented in the R-G-B color coordinate system. Another way to describe a color pixel is to use the luminance and 2 chrominance components, where the luminance corresponds to the brightness. There are many other color coordinate systems.

The process of representing an image by a stream of 'ones' and 'zeros', i.e. using bits, is commonly referred to as image coding. That is, an image is converted to a binary stream by image coding. Decoding refers to the process of obtaining the image from the binary stream. Image compression refers to the process of reducing the number of bits to represent a given image. In many image coding methods, it is desirable to use the fewest number of bits to represent the image. For this reason, image coding and image compression are often used synonymously.

Image coding or compression can be lossless or lossy. A lossless coding method produces a binary stream from which the original image can be obtained exactly. A lossy coding method produces a binary stream but the decoded image, called the compressed image, is not exactly the same as the original image. In lossy coding, the compressed image can look indistinguishable from the original, or it can look different from the original, in which case the difference shows up as artifacts.

Instead of being described by its pixel values, a digital image can also be described in the 'frequency domain' or more generally the 'transform domain'. The N×M values of f is transformed to a set of numbers called transform coefficients, usually also N×M in number. Commonly used transformations include the Discrete Cosine Transform (DCT), Discrete Fourier Transform (DFT), and Wavelet Transform.

Current computer and information technology allow easy editing and perfect reproduction of digital images, which in turn can lead to problems with copyright protection, ownership verification and authentication. Such problems are addressed by digital watermarking, which concerns processes that embed or insert data into a multimedia data object. The inserted data are often called digital watermarks. Depending on the application, digital watermarking may be applied to different types of data, including digital still images, digital audio and digital video. For images, a visible watermark is one that is intentionally made to be noticeable to a human observer whereas an invisible watermark is one that is not perceptible to a human but may be extracted by a computer or other electronic means. Whether visible or invisible watermarking is employed depends upon the particular application. The following references may be consulted for further background on digital watermarking:

[1] Mintzer, et al., "Effective and Ineffective Digital Watermarks," IEEF-ICIP, 1997.

[2] Friedman, "The Trustworthy Digital Camera: Restoring Credibility to the Photographic Image," IEEE Trans. on Consumer Electronics, November 1993.

[3] Schneider, et al., "A Robust Content Based Digital Signature for Image Authentication," IEEE-ICIP, 1996.

[4] Storck "A New Approach to Integrity of Digital Images," IFIP Conf. on Mobile Communication, 1996.

[5] Yeung, et al., "An Invisible Watermarking Technique for Image Verification," IEEE-ICIP, 1997.

[6] Swanson, et al., "Robust Data Hiding for Images,= IEEE DSP Workshop, 1996.

[7] Koch, et al., "Towards Robust and Hidden Image Copyright Labeling," IEEE Workshop on Nonlinear Signal and Image Processing, 1995.

[8] Zeng, et al., "On Resolving Rightful Ownership of Digital Images by Invisible Watermarks," IEEE-ICIP, 1997.

One application of digital watermarking is in the field of digital photography, in which images are captured with a digital camera or photographs are digitized. In these cases, it would be advantageous to embed an invisible watermark in the image at the time of capture or digitizing. This watermark could be used later (e.g., in a court of law) to verify that the image is authentic, i.e., has not been altered.

It is important that a method of waterinarking for authentication can:

(1) permit the user to determine whether an image has been altered or not;

(2) identify where in the image such alteration occurred; and (3) allow the watermarked image stored in a lossy-compression format (such as JPEG).

In addition, it is highly desirable (4) to integrate the watermark with the host image rather than as a separate data file; and (5) to have the watermark invisible under normal viewing conditions.

Previously known methods for image authentication do not have all of the above capabilities. The digital signature methods (e.g., above cited references [2][3][4]) do not have capabilities 2 and 3; the pixel-domain watermarking methods (e.g., above cited reference [5]) do not have capability 3; the frequency-domain data hiding schemes (e.g., above cited [6] [7]) cannot always localize alterations and may introduce excessive distortion. Since the present invention and the pixel-domain method [5] have certain similarity, that method will be briefly reviewed and the difference pointed out.

The method presented in [5] embeds a watermark, which is a binary pattern, in the pixel domain, using a look-up table (LUT). The method is illustrated in FIG. 1, where the (unmarked) grey scale image consists of a block of 8×8 pixels whose values are shown and the pattern to be embedded is the letter "I", also formed with a block of 8×8 pixels. Suppose the black pixels of the pattern correspond to "0" and the white pixels correspond to "1". These "1"s and "0"s are called marking values. As shown in FIG. 1, the top row of the LUT are the luminance values of the unmarked image and the bottom row are binary, i.e., "1" or "0". The 4th number in the first row of the image has a value of 153 as shown; the binary pattern corresponding to this pixel is black and therefore has the value "0". From the LUT, 153 corresponds to a "0", agreeing with the pixel value of the pattern. So the number 153 is unchanged in the marked image, i.e., the 4th pixel in the first row of the marked image has the value 153. The first number in the second row of the image has the value 144. The corresponding binary pattern is white and therefore has the value "1". But from the LUT, 144 corresponds to a "0". So the number 144 is changed to 143 for which the corresponding value in the table is "1". Thus, the first pixel in the second row of the marked image has the value 143. All pixels in the original image are processed in this manner. That is, if the luminance of a pixel in the original image does not map to the value in the corresponding binary pattern by the LUT, the luminance value is changed to a new value which is close to the original value and which corresponds to a binary value that agrees with the binary pattern.

The marked image is made up of an 8×8 block of pixels from which the watermark is easily extracted by referring to the LUT. The fourth pixel in the first row of the marked image is 153, for which the corresponding binary value from the LUT is "0". So the fourth pixel in the first row of the extracted pattern is black. Similarly, the first pixel in the second row of the marked image is 143, for which the corresponding binary value from the LUT is "1". So the first pixel in the second row of the extracted pattern is white. When all the pixels of the marked image have been processed in this manner, a pattern of "I" will have been extracted.

If a pixel in the marked image is changed, the changed value will be mapped to either "1" or "0", each with a probability of 0.5. So there is a 0.5 probability that the extracted watermark for that pixel will be different from the corresponding pixel in the original pattern. Such a possible change in a single pixel may or may not be observable by a viewer. However, if a group of neighboring pixels is changed, the probability that the corresponding part of the extracted watermark will look different is significantly increased. Images are often lossily compressed to save transmission time and storage. If an image is watermarked using the method just described, and if the marked image is then lossily compressed, the watermark inserted in the image will be changed due to the compression process. Therefore, the watermarked image from such an approach cannot be lossily compressed without adversely affecting the watermark. Another disadvantage of the above method is due to the fact that a human viewer can easily notice the changes in the pixel values in the smooth regions of the image due to the embedding process, making it difficult to insert the watermark in the smooth regions of an image.

As described in greater detail below, the present invention inserts a watermark in the quantized transform domain coefficients using a lookup table. This allows the watermarked image to be stored in compressed form. The present invention can also insert the pattern in the smooth regions of an image and can embed content based features in addition to a pattern, so the reliability of detecting alterations of the image is significantly increased. In addition, a shuffling scheme of the present invention can also be applied to embedding a watermark in the pixel domain of smooth regions.

The result achieved by present invention is illustrated with FIGS. 2A, 2B and 2C. FIG. 2A is a JPEG compressed image, into which we embed a watermark of the pattern "PUEE" (shown in FIG. 2B) using the method of the present invention. The watermarked image, shown in FIG. 2B, is indistinguishable from the unmarked original, FIG. 2A. Two modifications are then made of the image. "Princeton University" on the top right corner is changed to "Alexander Hall" and "Copyright 1997" in the lower left corner is changed to "January 1998", as illustrated in FIG. 2C. Also shown in FIG. 2C is that the watermark is extracted from this modified image, which clearly shows where modifications have taken place.

III. SUMMARY OF THE INVENTION

A primary object of the present invention is to provide a digital watermarking process whereby an invisible watermark inserted into a host image can be utilized to determine whether or not the image has been altered and, if so, where in the image such alteration occurred. This and other objects of the invention are achieved by the methods disclosed herein for applying a digital watermark to an image.

The inventive methods include the step of deriving from the image a plurality of component images, wherein each component image contains coefficients. The inventive methods employ at least one look-up table containing a plurality of coefficients and corresponding values, wherein at least some of the look-up table coefficients match coefficients in the component images. A watermark is then embedded in the image. The last step, embedding the watermark, is carried out by performing the following steps for at least some of the component images: (1) selecting a coefficient into which a marking value, representative of a corresponding portion of the watermark, is to be embedded; (2) using the value of the selected coefficient to identify a corresponding value in the look-up table(s); (3) leaving the identified coefficient unchanged if the corresponding value is the same as the marking value; and (4) changing the identified coefficient if the corresponding value is different from the marking value.

Another aspect of a preferred implementation of the invention is that, in the embedding step, the identified coefficient is changed minimally to a value having a corresponding value in the look-up table which is the same as the marking value. For example, the identified coefficient is preferably changed minimally by changing its value to that of the nearest coefficient having a corresponding look-up table value equal to the marking value.

Yet another aspect of the present invention concerns "shuffling" the coefficients prior to the embedding step. Such shuffling may involve concatenating the coefficients of a plurality of blocks into a string and randomly shuffling the order of the coefficients in the string. In this embodiment, the string is unshuffled after the embedding step.

Preferably, for error correction purposes, the marking value (e.g., marking bit) is embedded multiple times in each block, and a majority voting process is employed to decode the respective blocks.

The preferred embodiments also include the step of identifying selected coefficients as being unembeddable, such that the unembeddable coefficients are not employed to embed marking values. For example, DC coefficients (i.e., $c_{00}$) of the DCT process may be considered unembeddable. In addition, a threshold value may be selected and used such that coefficients having a value below the threshold value are considered small valued and thus unembeddable.

The preferred embodiments of the present invention can determine whether a marked image has been altered, and where such modification took place. In addition, after the insertion of the watermark, the image may be stored in a lossy-compression form, thus permitting efficient storage and distribution. Moreover, the preferred embodiments produce two output signals for authentication: (1) a meaningful pattern to facilitate a quick visual check, and (2) an additional signal to detect unauthorized alteration. In addition, other information, such as content features, can be embedded into the image. The invention can be applied to an image compressed using JPEG or other techniques, such as Wavelet compression, and the marked image can be kept in the compressed format. Any alteration made on the marked image can be localized, making the preferred embodiment suitable for use in a "trustworthy" digital camera or camcorder. Furthermore, since the invention is computationally and structurally efficient (including the use of a look-up table), it can be applied in digital video authentication.

Other features and advantages of the present invention are described below.

IV. BRIEF DESCRIPTION OF THE DRAWINGS

FIGS. 2A–2C illustrate the overall result achieved by the present invention.

FIGS. 7A and 7B are block diagrams illustrating the embedding and authentication procedures, respectively, in accordance with the present invention.

FIGS. 8A and 8B are similar to FIGS. 7A and 7B in that they illustrate embodiments of the watermark embedding and authentication procedures, respectively, but include shuffling and inverse shuffling steps in accordance with another embodiment of the invention.

V. DETAILED DESCRIPTION OF PREFERRED EMBODIMENTS

We first illustrate the present invention by showing how to insert a binary pattern as the watermark in a JPEG compressed grey-scale image. The present invention, however, may be extended to other compression methods, such as Wavelet compression, to color images, and to video. Before describing the preferred embodiments of the invention, we will provide a brief overview of the JPEG method for lossy compression. Details can be found in the paper G. K. Wallace, "The JPEG still picture compression standard," IEEE Trans on Consumer Electronics, February 1992.

V.1 Overview of JPEG Lossy Compression

The JPEG method for image compression has been adopted as an international standard. When the image is lossily compressed, the compressed image may differ imperceptibly or significantly from the original image, depending on the parameters chosen to perform the compression.

Figure 3:
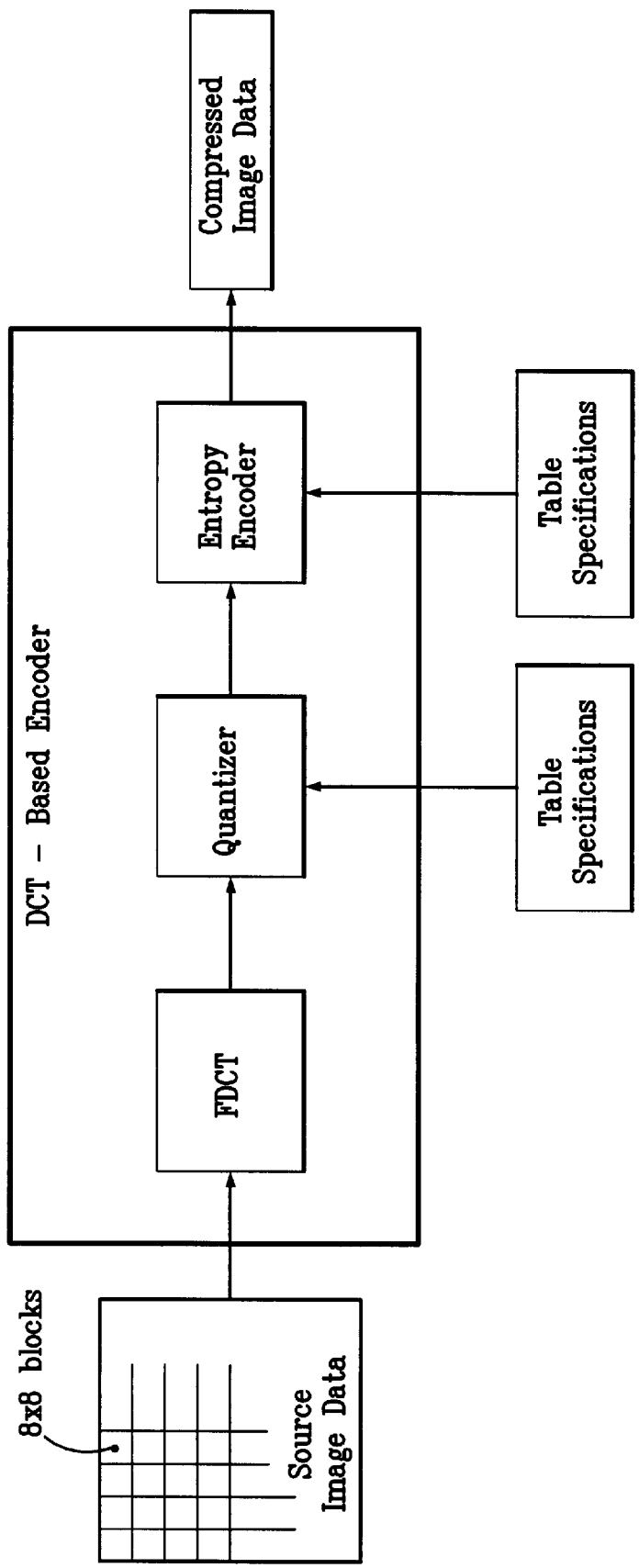
FIG. 3 depicts a JPEG still image compression method.

The JPEG method is illustrated in FIG. 3. To compress an image using the method, the image is first divided into blocks, typically of 8×8 pixels. Each block of pixels may be viewed as a component of the original image and hence be called a component image. For each block, a two-dimensional discrete-cosine-transform (DCT) is performed, resulting in 8×8 DCT coefficients for that block. The coefficients represent the spatial frequency components of the 8×8 block of pixels and are denoted by $c_{ij}$, where i and j range from 0 to 7. The $c_{00}$ coefficient is called the DC coefficient, corresponding to the DC component of the original image block in both horizontal and vertical directions, while the $c_{77}$ coefficient contains the highest frequency content of that block.

To lossily compress the image, each DCT coefficient is quantized, and the normalized quantized coefficients are run-length encoded, followed by Huffman or arithmetic encoding to produce a bit stream. To obtain the reconstructed image, the above process is reversed. That is, the normalized quantized coefficients are recovered from the bit stream, and inverse DCT of these coefficients taken to produce 8×8 pixels. All blocks of the 8×8 pixels thus obtained are put together to form the reconstructed image. If the quantized DCT coefficients differ very little from the original unquantized coefficients, then the reconstructed image differ imperceptibly from the original image. Otherwise, the reconstructed image will differ noticeably from the original image.

Many JPEG encoders use a quantization table to quantize the DCT coefficients by dividing each coefficient by the corresponding entry in the table and then rounding it to the nearest integer which is called the normalized quantized coefficient. To achieve different level of compression, the entries of a table is scaled up or down by a number called the quality factor Q. Table 1 together with a value of Q between 1 and 100 is often used for such quantization, as follows. For Q=50, the table is used unchanged as the quantization table. That is, each DCT coefficient is multiplied by the corresponding entry of Table 1 and the result is rounded and clipped. For Q>50, a new table for quantization is generated by multiplying Table 1 by (100−Q)/50. For Q<50, the new quantization table is generated by multiplying Table 1 by 50/Q. It should be mentioned that the present invention does not depend on this or any other quantization table.

TABLE 1

8 × 8 Quantization Matrix

| 16 | 12 | 10 | 16 | 24  | 40  | 51  | 61  |
|----|----|----|----|-----|-----|-----|-----|
| 11 | 12 | 14 | 19 | 26  | 58  | 60  | 55  |
| 14 | 13 | 16 | 24 | 40  | 57  | 59  | 56  |
| 14 | 17 | 22 | 29 | 51  | 87  | 80  | 62  |
| 18 | 22 | 37 | 56 | 68  | 109 | 103 | 77  |
| 24 | 35 | 55 | 64 | 81  | 104 | 113 | 92  |
| 49 | 64 | 78 | 87 | 103 | 121 | 120 | 103 |
| 72 | 92 | 95 | 98 | 112 | 100 | 101 | 99  |

V.2 Subband and Wavelet Image Compression

Another well known image compression method is based on subbands. In this method, an image is filtered and the outputs of the filters are sub-sampled or down sampled. (To sub-sample by a factor of 2, one out of every two samples are deleted. To sub-sample by a factor of K, all but one from every K samples are deleted.) The results are component images, or more specifically highpass and lowpass component images if the filters used are highpass and lowpass filters. The component images usually bear certain resemblance to the original image. The process of filtering and sub-sampling is often repeated several times. The final results are called subband coefficients, or subband images. These subband coefficients are then quantized and the quantized coefficients are then assigned to codes. In subband coding, the quantized coefficients from each subband are usually coded independently. Another well known method for image coding is based on wavelets, which is quite similar to subband coding in the initial steps. That is, the image is passed through a number of filters, and the outputs of these filters are subsampled to produce a number of coefficients, called wavelet coefficients.

Figure 4:
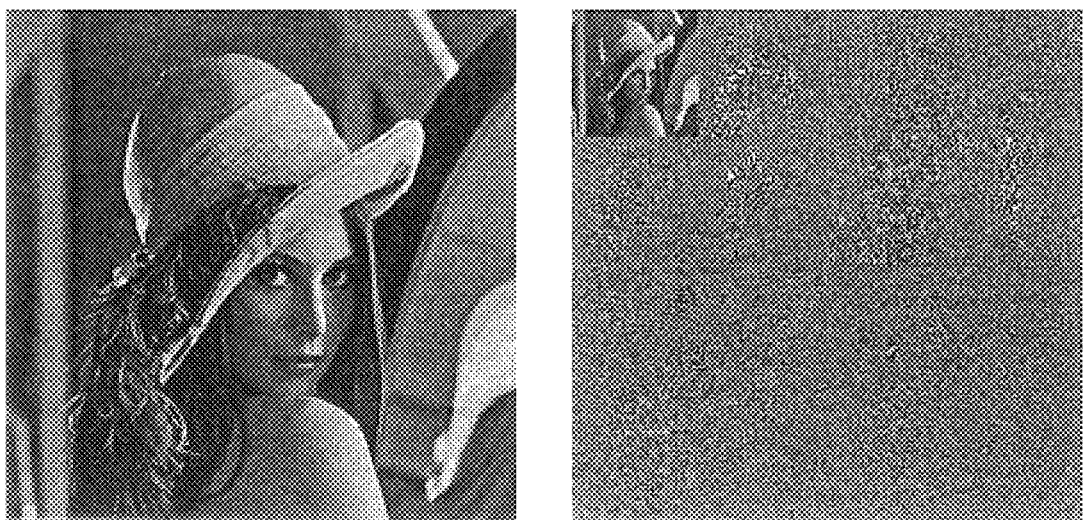
FIG. 4 illustrates an image and its wavelet coefficients.

Shown in FIG. 4 is an image and its wavelet coefficients. Notice the varying degree of resemblance of the seven components to the original image. The wavelet coefficients are then quantized and coded. Notice also that the seven components are not of the same size. The wavelet coefficients from one filter output is often correlated with those from other filter outputs, and wavelet coding takes advantage of such information. Although in principle this advantage can also be used in subband coding, what most researchers refer to as subband coding actually code each subband separately, as mentioned in the previous paragraph.

Details of these image coding methods can be found, for example, in M. Vetterli and J. Kovacevic, Wavelets and Subband Coding, Prentice Hall, 1995.

V.3 Overview of Preferred Embodiments

Figure 1:
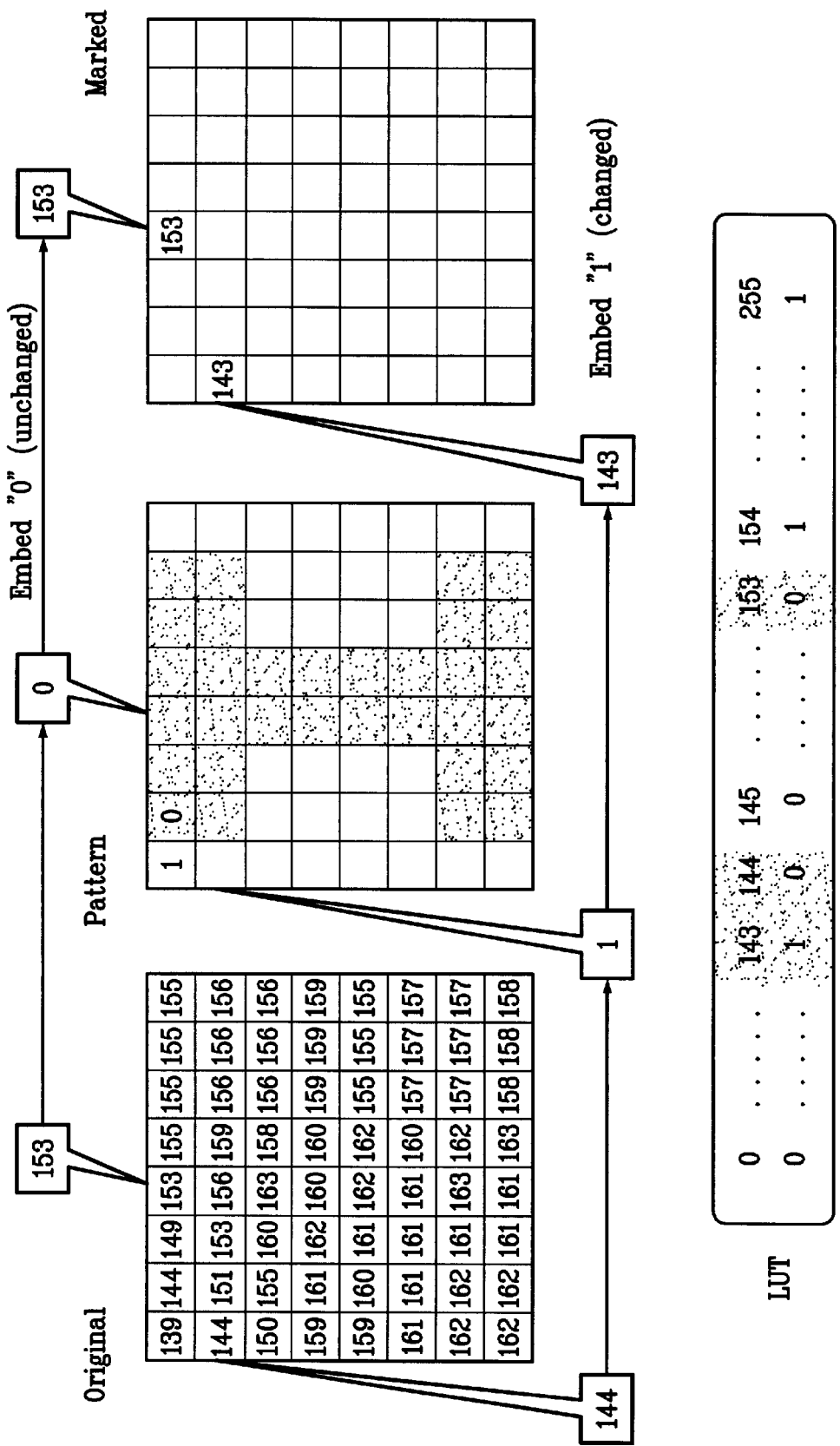
FIG. 1 depicts a pixel domain watermarking method of the above cited reference [5].
Figure 2A:
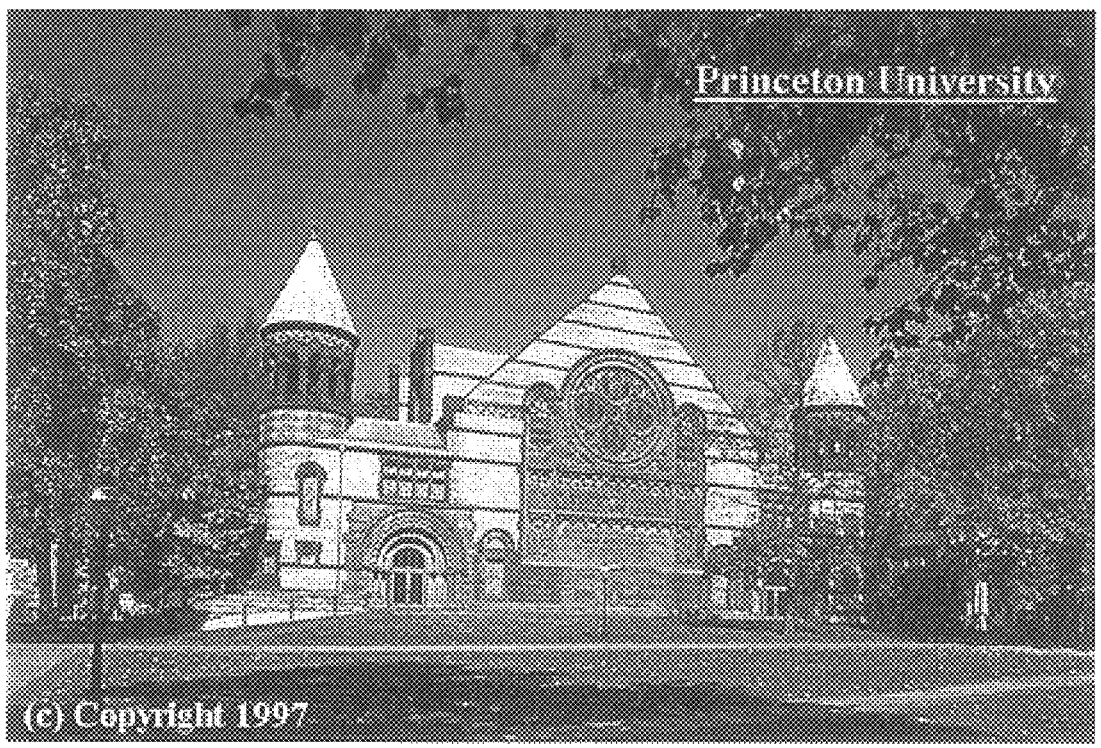

We first describe the present invention by demonstrating how to insert a pattern in a JPEG compressed grey-scale image. For simplicity, we shall use for illustration a binary pattern. We will discuss later how other information, such as content features, can be embedded into the image. The embedding of a binary pattern is done by modifying some of the normalized quantized DCT coefficients using the binary pattern and a look-up table (LUT) in such a way that the resulting marked image is visually not different from the original compressed image. The inserted pattern can be extracted from the marked image. The binary pattern can be a visually meaningful pattern such as a logo, letters, etc. Note that the marked image is in a compressed form. If the marked image is unchanged, then the extracted pattern will be identical to the original inserted pattern. If, on the other hand, the marked image was altered, then the extracted pattern will reveal where such alteration took place, as demonstrated earlier in FIG. 2.

Figure 5:
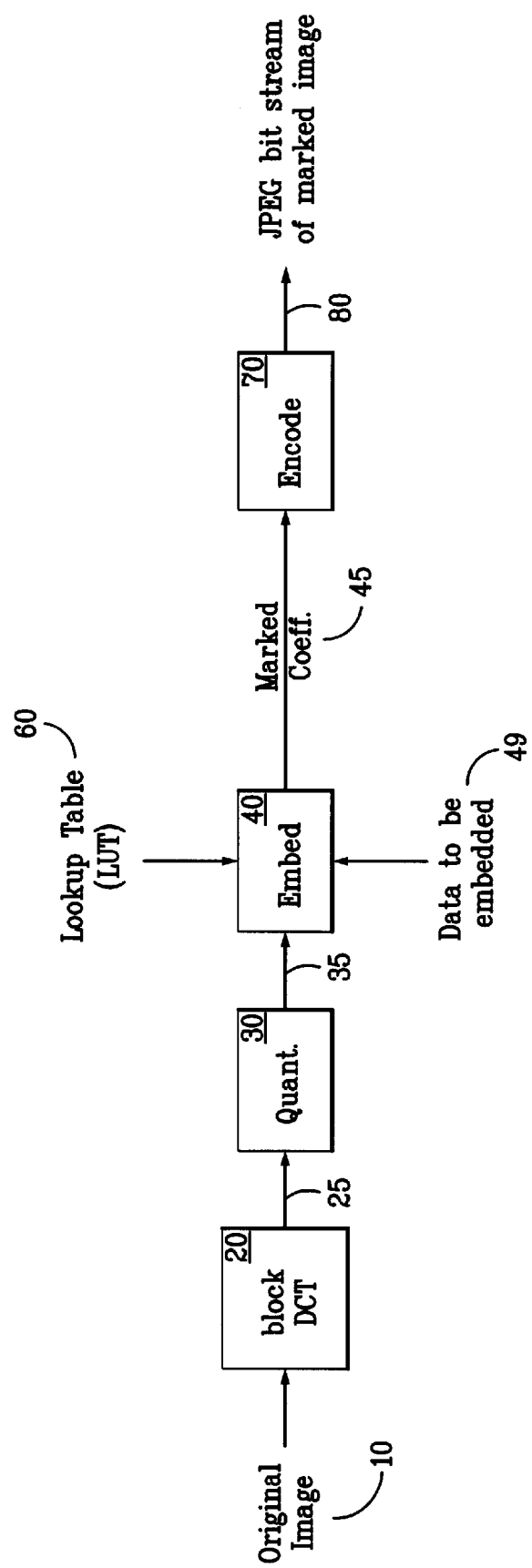
FIG. 5 is a block diagram of a watermarking process of the present invention.

FIG. 5 schematically depicts a preferred embodiment of such a watermarking process in accordance with the present invention. As shown, an original image 10 undergoes a block by block DCT 20 and quantization 30, which yields a set of normalized quantized coefficients 35. The embedding process 40 modifies the quantization coefficients 35 to give a set of marked coefficients 45. The embedding process 40 employs a prescribed set of data to be embedded 49 (i.e., the watermark) and a look-up table 60, as described in detail below, to generate the marked coefficients 45. The marked coefficients 45 are then input to an encoding process 70, which yields a bit stream of the compressed watermarked image 80. The inserted data can be extracted by simply reading from the LUT the value corresponding to the DCT coefficient of the marked image. If a part of the watermarked image is altered, the DCT coefficients from that part of image will be changed, hence the extracted watermark will differ from what was originally inserted, thus identifying where in the image the modification has occurred. This assumes that one bit of a binary watermark can be embedded in the corresponding block of the image. The question of how to make sure that it is possible to embed one bit in each block is discussed below.

V.4 Insertion of Binary Pattern Using a Look-up Table

Figure 6:
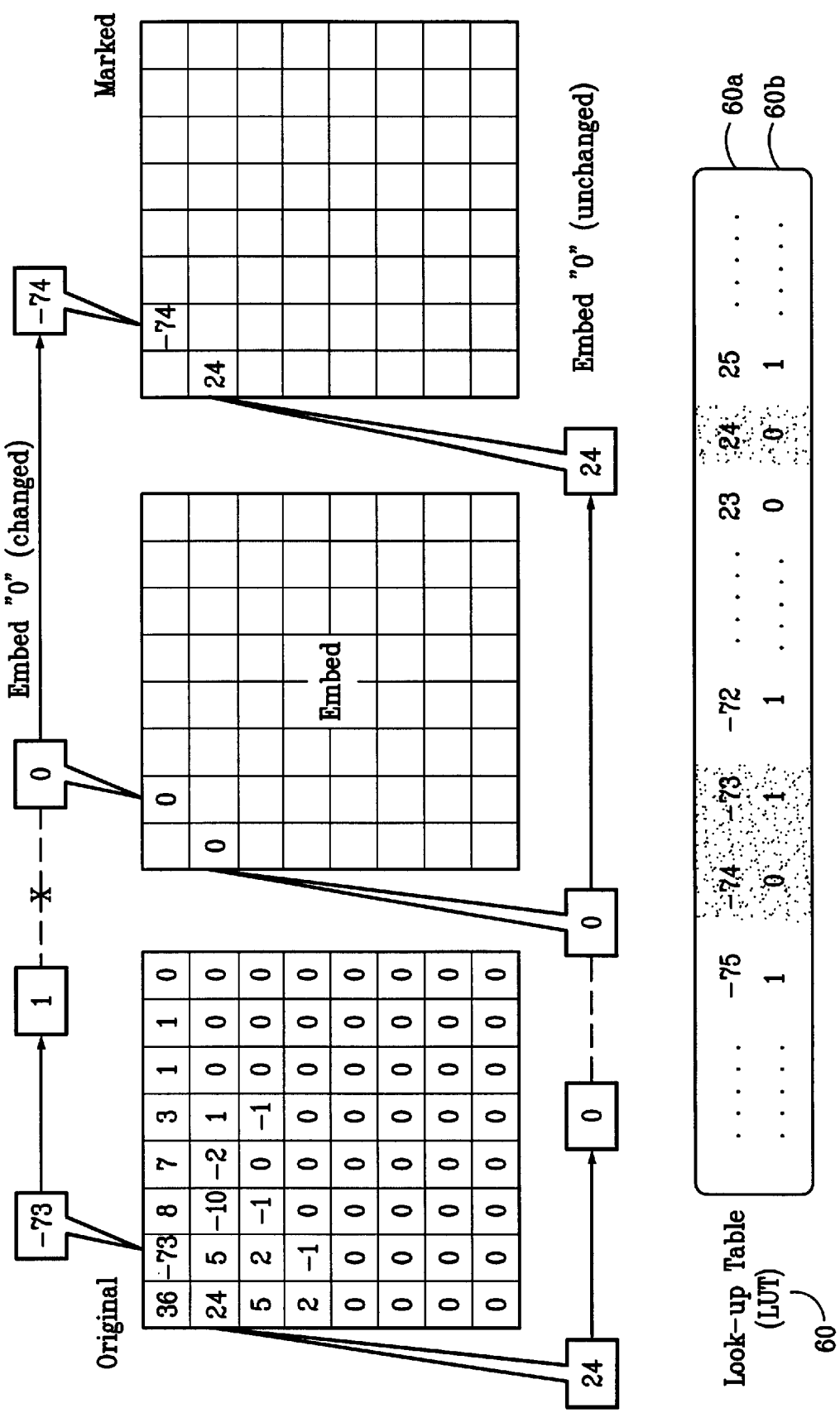
FIG. 6 depicts a transform domain embedding process employed by the present invention.

We now discuss details of how to insert the watermark. As shown in FIG. 6, a look-up table (LUT) 60, which is generated beforehand, maps every possible value of JPEG coefficient to "1" or "0" with the lengths of consecutive "1" or "0" limited. Thus, the LUT 60 includes a row 60a of JPEG coefficients and a row 60b of corresponding "1"s and "0"s. To embed a "1" in one of the original JPEG coefficients 35, that coefficient is unchanged if the entry of the table corresponding to that coefficient is also a "1". On the other hand, if the original coefficient corresponds to "0" in the table, that coefficient value is changed minimally to a neighboring value that has a "1" entry. The procedure for embedding of a "0" is similar, i.e., the coefficient is unchanged if its corresponding LUT entry is "0" but is changed minimally if its corresponding LUT entry is "1". These "1's" and "0's" are called marking values. It should be pointed out that the expression (to embed) as used herein does not necessarily require that the original data value be altered, but only that it is altered as necessary to make it equal to a value whose corresponding LUT value ("0" or "1") is equal to the value to be embedded.

In the example of FIG. 6, zeros ("0"s) are to be embedded in two DCT coefficients of values "−73" and "24" respectively. Since the binary entry corresponding to "−73" is 1, "−73" is changed to "−74" for which the binary entry is "0" which is to be embedded. The coefficient value of "24" is unchanged because its binary entry is already "0".

The length of successive zeros and ones is limited to avoid noticeable distortion. The following procedures can be used to generate an L-entry look-up table T[.] with maximum allowed run of r.

Step-1: i=1.
Step-2: If i>r and T[i−1]=T[i−2]= . . . =T[i−r], then
T[i]=1−T[i−1].
Otherwise, randomly select a number from {0, 1} and set T[i] to this value.
Step-3: Increase i by 1. If i>L, stop. Otherwise go back to Step-2.

Random numbers can be generated by pseudo-random generator; details can be found, for example, in R. Sedgewick, Algorithms in C, Addison-Wesley, 1990.

It should be noted, however, that there are many ways to generate such a table and the present invention is not limited to any one procedure. It should also be noted that more than one look-up table can be used to insert data and that the second entry of the table is not limited to be binary.

V.5 Selection of DCT Coefficients for Data Insertion

When the quantized coefficients are changed too much, the marked image will be visually different from the original image. On the other hand, a large change of the coefficients allows more information to be embedded into the image. The human visual system, in particular the just noticeable difference, has been used to determine how much can an image be changed without causing noticeable differences. The human visual system is explained, for example, in A. K. Jain, Fundamentals of Digital Image Processing, Prentice-Hall, 1989. The just noticeable differences is presented, for example, in A. J. Ahumada, et. al, "Luminance-model-based DCT quantization for color image compression," Proc. SPIE, Vol. 1666, 1992.

In accordance with the presently preferred implementation of the invention, several steps are taken to ensure that the markings are invisible. As mentioned above, the lengths of runs of "1" and "0" entries in the LUT is limited to avoid excessive modification on the coefficients. The DC coefficients is unchanged unless the quantization step is small.

Also, the small valued AC coefficients are unchanged. Those DCT coefficients that cannot be changed because of these constraints are called unembeddable, and those coefficients that can be changed are called embeddable. On the average, between 6 to 10 of the coefficients in a block of a typical natural image are embeddable. This means one can normally embed more than one bit of information in each block. All the embeddable coefficients in a block can be used to embed the same bit in the binary pattern in the manner described in the previous section. In this case, the extraction of the embedded information can be done using majority voting. The reason for using more than one coefficients to embed same information is explained in the next section. However, the number of embeddable coefficients vary significantly from block to block and some blocks may not contain any embeddable coefficients. In particular, it is difficult to embed data in smooth blocks where all AC coefficients are very small and hence unembeddable. If no bits of the watermark is embedded in a block, then the alteration of that block would be difficult to detect. To over come this difficulty, two methods are presented later in the section entitled Smooth Region Embedding.

V.6 Embed Other Data

The watermark that was inserted in the previous discussion is a binary pattern which often can provide a quick visual way of detecting modifications. It is clear that a non-binary pattern can be similarly embedded. It is also possible to embed 'content features'. A simple example of such features is the most significant bit of average intensity of a block or of a group of blocks such as a macroblock consisting of 4 blocks (16×16 pixels). The combination of patterns and features is suitable for such applications as image authentication for "trustworthy" digital cameras. The embedding and authentication procedures are illustrated in FIGS. 7A and 7B.

As shown in FIG. 7A, the embedding process is the same as the basic process illustrated in FIG. 5 except that content features are extracted from the original image 10 or from the DCT coefficients 25 or from both. The content features 90 are input to the embedding process 40 along with the pattern 50.

The authentication process, as shown in FIG. 7B, starts with a test image 100 (i.e., a watermarked image whose authenticity is to be tested). It is transformed by a block DCT process 20 and then quantized in the same manner as in the embedding/watermarking process to produce normalized quantized coefficients 36. Content features 91 are also extracted from the test image. The watermark is extracted by an extraction process 110, which is the inverse of the embedding process 40. In the extraction process 110, the normalized quantized DCT coefficients 36 are examined in view of the look-up table 60 (the same table as used in the watermarking process of FIGS. 5 and 7A). The outputs of the extract process 110 are a pattern 51 and the features 92. The pattern 51 can be visualized by using visualize process 120, such as a printer or computer monitor, to allow a human observer to quickly identify which part of the image has been changed. The extracted pattern 51 can also be compared with the original pattern 50, if available, to detect possible alterations. The compare process 130 compares the extracted features 92 with the features 91 to provide an additional detection of possible alterations. If the test image 100 is the same as the marked image without modification and if the bit stream of the test image is used for authentication, its normalized quantized coefficients are available from the bit stream and are the same as the coefficients 35, and the features 90, 91 and 92 are identical.

If the test image 100 is the same as the marked image without modification but it is presented for authentication as an image, then a small number of coefficients 36 may be different from coefficients 35 because of the rounding error in the computation of coefficients. Error correction coding, such as using majority voting as mentioned in the previous section, can be incorporated in the embed process 40 to guard against such errors.

V.7 Smooth Region Embedding

The percentage of smooth regions in an image varies widely, depending on the subject matter. But typically, 20% of a natural image may be regarded as smooth. As mentioned previously, blocks in the smooth region of an image may not have any DCT coefficient to insert the watermark or to embed features. This is true in spite of the fact that between 10 to 15% of the DCT coefficients in a natural image are embeddable. Thus, on the average, there are 7 to 10 embeddable coefficients per block on average. In other words, there are plenty of embeddable coefficients in an image, but the uneven distribution of them leaves some blocks with no coefficients in which to embed data.

This difficulty can be circumvented by the following shuffling process. For an image divided into blocks of 8×8 pixels, the quantized DCT coefficients of all blocks can be concatenated into a single string, of which the first 64 numbers are from the first image block, the next 64 numbers are from the second image block, and so forth. Some of the groups of 64 coefficients may not have any coefficient that are embeddable. Suppose the order of this string is randomly shuffled to produce a second string. Each coefficient in the second string comes from one and only one coefficient in the first stream, that is, before shuffle. Because of the random shuffle, the probability that each group of 64 numbers in the second string contains at least one embeddable coefficient is significantly increased. In fact, it can be calculated that the probability of no embeddable coefficients in a group of 64 coefficients in the second string is about 0.1%. Therefore, the coefficients in the shuffled string can be used to embed data as described previously, even though these 64 coefficients are not those computed from that block.

The embedding process when shuffling is used is illustrated in FIG. 8A. It is identical to that described above except that the quantized DCT coefficients of all blocks are concatenated into a single string and randomly shuffled, in the process 140, before embedding. Suppose the blocks arc of size 8×8. Then each of the 64 coefficients of the shuffled string are used to embed the data for one block.

Figure 9:
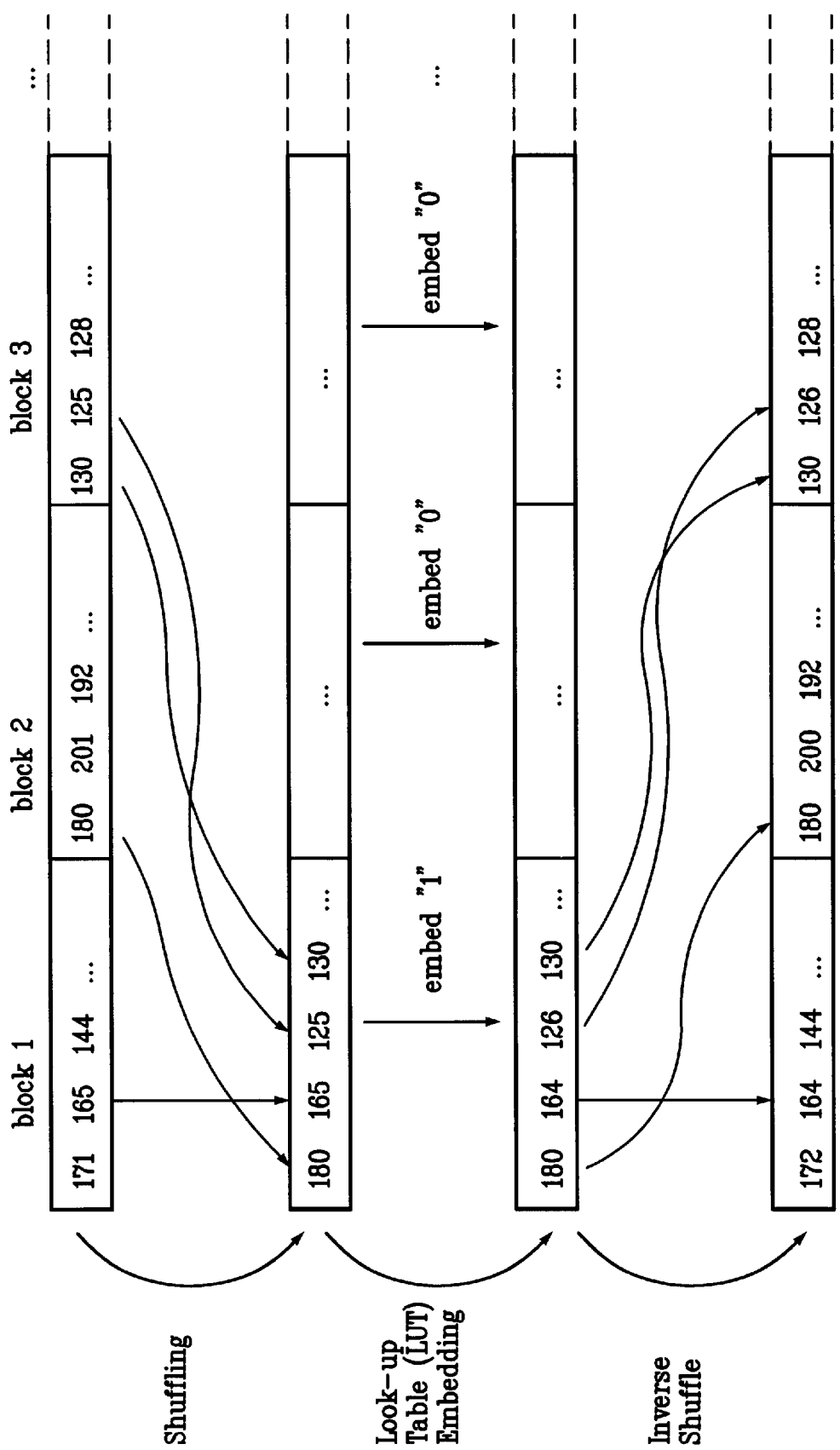
FIG. 9 depicts the shuffling process.

This procedure is illustrated with the help of FIG. 9 for the case of embedding a binary pattern. Suppose the coefficients of the first block have values: 171 165 144 . . . , the coefficients for the second block have values: 180 201 192 . . . , the coefficients of the third block have values: 130 125 128 . . . , etc., as shown in the first sequence. The shuffling reordered this sequence and produces the second sequence. In this illustration, the first block of the shuffled coefficients have values: 180 165 125 130 . . . , where the first coefficient "180" comes from the first coefficient of block 2 in the original (unshuffled) sequence, the second coefficient "165" is not moved by the shuffle, the third coefficient "125" comes from the second coefficient of the original block 3, and the fourth coefficient "130" comes from the first coefficient of the original block 3. Suppose a "1" is to be embedded in block one and suppose this embedding changes the second coefficient "165" to "164" as shown in the third sequence of FIG. 9. After embedding, all coefficients are inverse shuffled, which is the fourth sequence of FIG. 9. It should be clear that the embedding of features can be done identically.

FIG. 8B depicts the authentication process for a test image 100. It is transformed by a block DCT process 20, quantized by the process 30, and then shuffled by the process 140, in the same manner as in the embedding process. The watermark is extracted by an extraction process 110. Using the LUT 60, the extract process 111 extracts the embedded pattern 53 and the embedded features 93. The extracted pattern 53 is visualized by the process 122 and the features 93 are compared with features 91 by the compare process 132. The visualize process 122 may be different from the visualize process 120 (FIG. 7) and the compare process 132 may be different from the compare process 130 (FIG. 7) because processes 122 and 132 may include inverse shuffle and other operations.

It should be noted that in addition to the random shuffling involving all the coefficients in one shuffle, other reordering of the DCT coefficients is possible, such as dividing all the coefficients of the image into several parts and shuffling each part separately.

It is mentioned above that the pixel domain embedding process may encounter difficulty when embedding data in the smoothed region of the image. The shuffling scheme described can be used to embed data in the pixel domain in the smooth regions of the image. As a simple example, suppose we embed one bit in every four pixels. Each pixel in the image is determined to be in a smooth region or not. Those in the smooth region are labeled unembeddable, and those not in the smooth region are embeddable. All pixels are then randomly shuffled. With the shuffle, the probability that any four pixels will have at least one embeddable pixel is significantly increased. The data is embedded and the pixels are inverse shuffled after the embedding.

Figure 10:
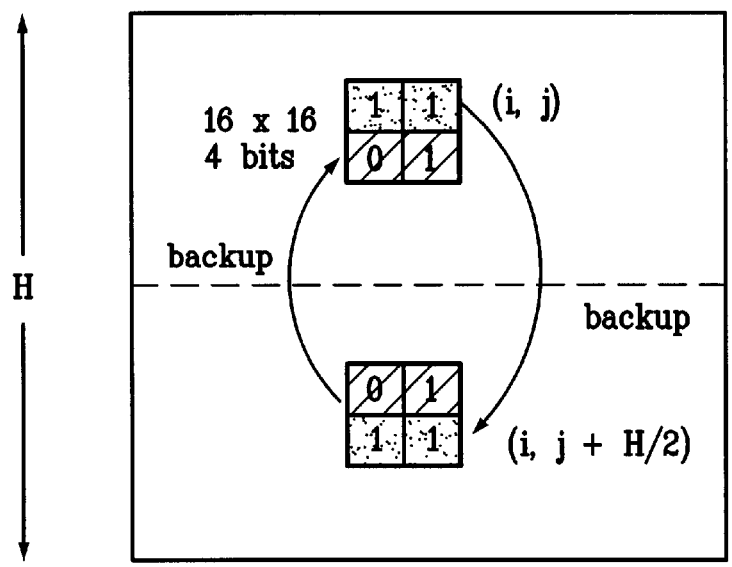
FIG. 10 illustrates a backup embedding scheme that may be employed in connection with smooth regions.

Another way of smooth region embedding is to embed data in blocks that are not smooth but whose location bears a fixed relationship to that of the smooth block in question. This method is simple to implement, as illustrated in FIG. 10. As shown, instead of embedding one bit independently in each block (8×8 pixels), we take a macroblock (16×16 pixels) as a unit, and use two bits to embed data corresponding to the current macroblock which is not smooth, and use the other two bits to embed the data corresponding to the companion macroblock which is smooth. That is, we use companion macroblocks as a backup. In the illustration of FIG. 10, the companion macroblocks are separated by half the image height, i.e., the two companion macroblocks are at location (i,j) and (i,j+H/2), where H is the image height in terms of number of blocks. One can also group 4 macroblocks located, say at (i,j), (i,j+H/2), (i+W/2,j) and (i+W/2, j+H/2) as companion macroblocks, where W is the image width in terms of number of blocks.

V.8 Detection of Alteration

As described above, modifications on a watermarked image are detected by visualizing the extracted pattern, or by comparing the pattern with the original pattern, or by comparing the extracted features using the LUT with the features of the test image. If the watermarked image has been changed, then the DCT coefficients from that part of the image that have been modified will be changed, hence the extracted watermark will be changed. Suppose one bit from the watermark is inserted into each block. The watermark extracted from the block in question after alteration has a 50% probability to be a "1" or a "0", hence there is 50% probability that the extracted bit may disagree with the bit originally inserted before the alteration. Since intentional modification of the image usually involves regions consisting of more than one block, this 50% detection probability is increased to 75% if two blocks are changed, to 87.5% if three blocks are changed, and to 93.75% if four blocks are changed.

Furthermore, suppose a block has more than one embeddable coefficients and we embed the same bit in all these coefficients. Suppose this block is modified and there are now N embeddable coefficients after modification. The probability that the extracted watermark bit from each coefficient is "1" or "0" each with a probability of 0.5. So the probability of all extracted bits agreeing with the originally inserted bit is reduced to $(0.5)N$. In general, the probability of correct detection of image modification will be increased if more than one bit per block are inserted into the marked image.

If shuffling is used, the detection of alteration can be illustrated by the following simple example. Suppose one block was altered. The embeddable coefficients from this block are now in different shuffled blocks, and the extracted bits from each of these coefficients have 0.5 probability of being changed. Suppose this is the only block that has been altered. Then error correction coding from the bits extracted from the shuffled blocks will identify those coefficients that have been changed. These coefficients would have to come from the altered block. The 'content features' embedded as watermarks can also be used to detect alteration.

V.9 Deterring Forgery of Watermarks

If the same look-up-table and the same pattern are used to mark many images, it is possible to obtain information about the table and the pattern from these images. Thus, to deter forgery, it is important to deter any attempt obtain information about the table and the pattern from the images. A simple way do this is to modulate the bits to be inserted by a pseudo random sequence. Depending on the computation and memory resources available for the particular application, such a pseudo random sequence can be either a fixed one or one selected from a list of such sequences. The shuffling process as described previously also helps to deter such an attempt, because it is difficult to forge watermarks without prior knowledge of the shuffling.

VI. Extensions

VI.1 Double Watermarking for Authentication and Ownership Verification

Previous work on double watermarking mainly emphasized embedding multiple labels (such as an ownership label, recipient label, etc.) using the same embedding approach. The present invention may be used in combination with watermarking methods for ownership verification such as described in the above cited reference [8].

VI.2 Color Images

Whereas each pixel in a grey scale image is represented by a single number, each pixel in a color image is represented by more than one numbers, such as the three components in the RGB or the YCrCb color coordinates. The present invention can be applied separately to each of the coordinates or to combination of coordinates.

VI.3 Other Compression Methods

The present invention can be applied to images compressed using methods other than JPEG. In wavelet compression, for example, the image is transformed into a number of component images from which the original image can be reconstructed. The component images are quantized. The present invention can be used to insert a watermark or watermarks into the component images by modifying the quantized coefficients using one or more look-up tables.

VI.4 Multi-level Data Embedding and Unequal Error Protection

As mentioned above, two sets of data, namely, a meaningful visual pattern and a set of low-level content features, may be embedded in the image for authentication purposes. Multilevel data embedding and unequal error protection can be employed to embed several sets of data with different error protection capabilities in accordance with their importance.

VI.5 Video Coding and Authentication of Video

A video consists of many images arranged in an orderly sequence. The individual images are called frames or pictures. Some video systems also divide each frame into two fields, called the even field and the odd field. Digital video refers to a video sequence in which the individual frames have been digitized.

Figure 11:
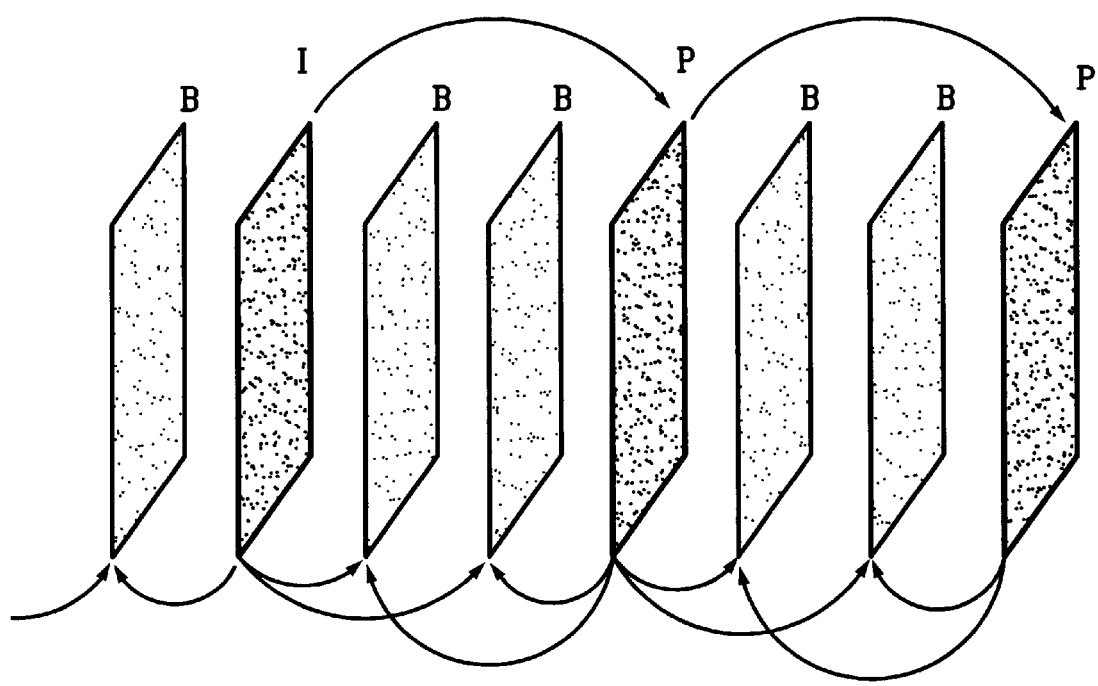
FIG. 11 illustrates three types of frames (I, P, B) in a video signal.
Figure 12:
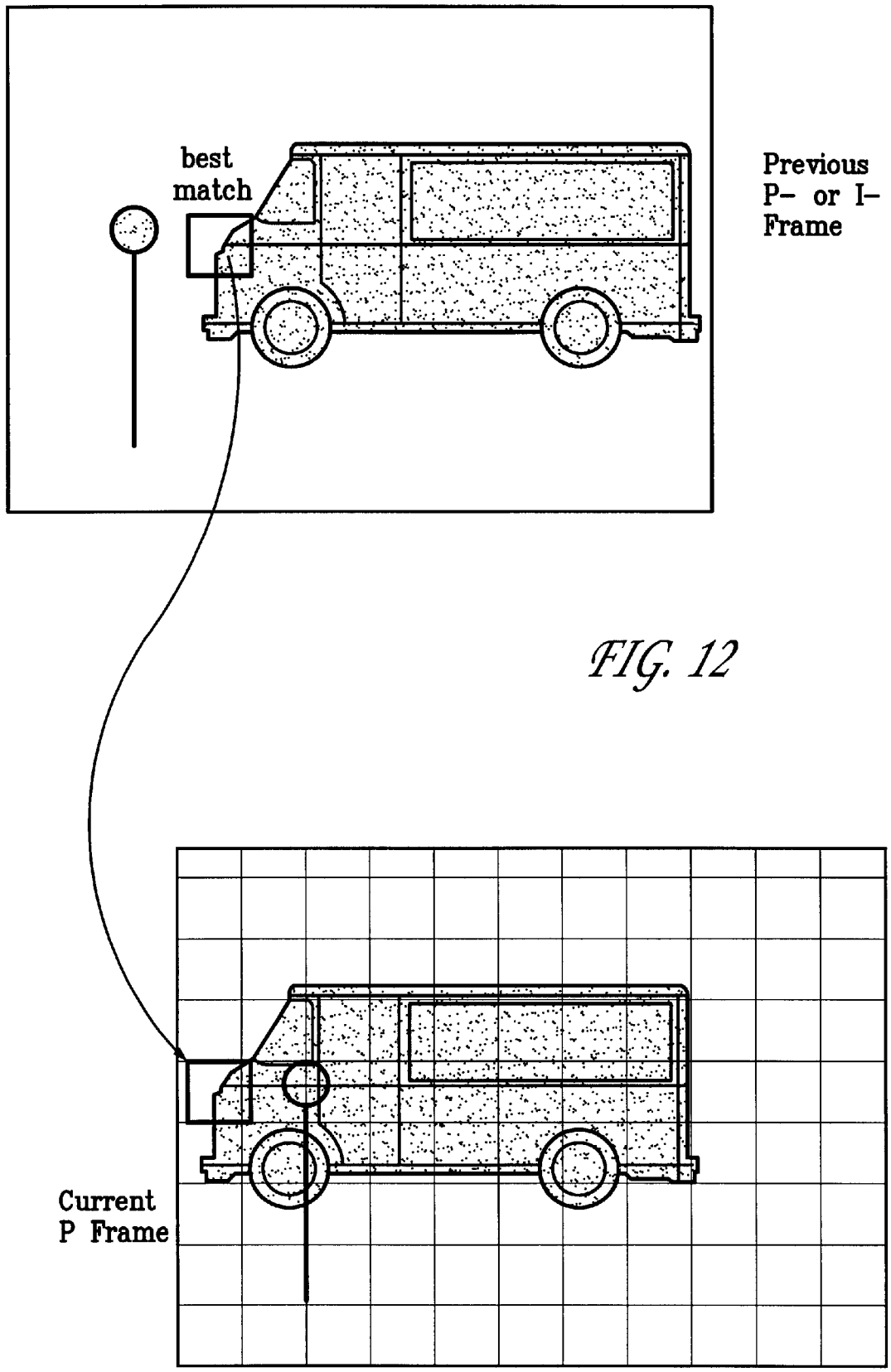
FIG. 12 illustrates a step in MPEG coding using motion compensation.

Video coding or video compression relies on the information redundancies found within each frame and among frames. A simple way to code a digital video is to code each frame separately, such as in the method known as motion JPEG. In the well known methods of MPEG-1 and MPEG-2, the frames are divided into three types: the intra-coded or I-frames, the predictive-coded or P-frames, and the bi-directional coded or B-frames. A typical MPEG coded video may have a pattern such as I B B P B B P B . . . , as illustrated in FIG. 11. The I-frames are codes by themselves, similar to JPEG coding. Each P-frame is divided into blocks, typically of size 8×8 pixels. Each block of pixels is matched with the pixels in the previous I or previous P-frame and the best 8×8 pixels in that I- or P-frame is called the reference block. A block in a P-frame and its reference block in a previous I- or P-frame is illustrated in FIG. 12. The difference is taken between each block and the reference block. This difference, called the residue or the displaced-frame-difference, is coded using a JPEG like method. The relative position of the block in the current P-frame and that of the reference block is called the motion vector of the block. Motion vectors are often determined using 4 blocks together (16×16 pixels), called a macroblock. Motion compensation coding refers to the determination of motion vectors and the coding of the residues.

The coding of B-frames is identical to that of P-frames except each block in the B-frame in question is matched with the I-frames and P frames either in the backward or the forward directions, or both. As for the P-frames, the residue after motion compensation of the B-frames is coded.

The present invention can be applied to digital video authentication. Consider, for the purpose of discussion, digital video compressed using the MPEG-1 and MPEG-2 standards. Since the I-frame is compressed in much the same way as a JPEG still image, the present invention can be applied straightforwardly.

To watermark P-frames that are coded using motion compensation, one can begin with a digital video where each frame has been watermarked using the approach described above. After MPEG compression, the watermark embedded in the I-frames can be extracted as discussed above. The extracted watermark embedded into the P-frames before MPEG encoding may be distorted from that originally inserted. If this is the case, then the residue after motion compensation, called the displaced frame difference, is modified. This process is repeated until the embedded watermark can be reliably extracted.

The true scope of the present invention is not limited to the presently preferred embodiments disclosed above. For example, the invention is not limited to processes employing the DCT, or to processes in which 8×8 or even 16×16 blocks of data are used to embed a "0" or "1" bit of a watermark. Other possible modifications of the preferred embodiments will be apparent to those skilled in the art.

We claim:

1. A method for applying a digital watermark to an image, comprising the steps of:

(A) deriving from the image a plurality of component images, wherein each component image contains coefficients;

(B) providing at least one look-up table containing a plurality of coefficients and corresponding values, wherein at least some of the look-up table coefficients match coefficients in said component images;

(C) embedding said watermark in said image by performing the following substeps for at least some of said component images: (1) selecting a coefficient into which a marking value, representative of a corresponding portion of the watermark, is to be embedded; (2) using the value of the selected coefficient to identify a corresponding value in said look-up table(s); (3) leaving the selected coefficient unchanged if the corresponding value is the same as the marking value; and (4) changing the selected coefficient if the corresponding value is different from the marking value;

further comprising the step of identifying selected coefficients as being unembeddable, wherein said unembeddable coefficients are not employed in step (C) to embed marking values, and wherein some of said coefficients are identified as DC coefficients, and said DC coefficients are considered unembeddable; and further comprising selecting a threshold value, wherein coefficients having a value below said threshold value are considered small valued and thus unembeddable.

2. A method for applying a digital watermark to an image, comprising the steps of:

(A) deriving from the image a plurality of component images, wherein each component image contains coefficients;

(B) providing at least one look-up table containing a plurality of coefficients and corresponding values, wherein at least some of the look-up table coefficients match coefficients in said component images; and (C) embedding said watermark in said image by performing the following substeps for at least some of said component images: (1) selecting a coefficient into which a marking value, representative of a corresponding portion of the watermark, is to be embedded; (2) using the value of the selected coefficient to identify a corresponding value in said look-up table(s); (3) leaving the selected coefficient unchanged if the corresponding value is the same as the marking value; and (4) changing the selected coefficient if the corresponding value is different from the marking value;

further comprising the step of identifying selected coefficients as being unembeddable, wherein said unembeddable coefficients are not employed in step (C) to embed marking values; and further comprising selecting a plurality of threshold values, wherein coefficients having values below said threshold values are considered small valued and thus unembeddable.

3. A method for applying a digital watermark to an image, comprising the steps of:

(A) deriving from the image a plurality of component images, wherein each component image contains coefficients;

(B) providing at least one look-up table containing a plurality of coefficients and corresponding values, wherein at least some of the look-up table coefficients match coefficients in said component images;

(C) shuffling the coefficients prior to said embedding step; and (D) embedding said watermark in said image by performing the following substeps for at least some of said component images: (1) selecting a coefficient into which a marking value, representative of a corresponding portion of the watermark, is to be embedded; (2) using the value of the selected coefficient to identify a corresponding value in said look-up table(s); (3) leaving the selected coefficient unchanged if the corresponding value is the same as the marking value; and (4) changing the selected coefficient if the corresponding value is different from the marking value;

wherein the image is divided into a plurality of component images of n×m pixels, wherein n and m are integers, and wherein each component image is transformed using the discrete cosine transform (DCT) into n×m transform coefficients; wherein the corresponding values in said look-up table(s) are binary-valued and are constrained to have a prescribed maximum run length of either binary value; wherein, in the embedding substep (D)(4), the selected coefficient is changed minimally to a value having a corresponding value in the look-up table(s) whose value is the same as the marking value, wherein the selected coefficient is changed minimally by changing its value to that of the nearest coefficient having a corresponding look-up table value equal to the marking value.

4. A method as recited in claim 3, wherein, prior to the embedding step (C), the image is compressed using JPEG compression.

5. A method as recited in claim 3, further comprising the step of shuffling the coefficients prior to said embedding step, wherein said shuffling step comprises concatenating the coefficients of a plurality of component images into a string and shuffling the order of the coefficients in said string; and wherein, after embedding, the string is inverse shuffled.

6. A method as recited in claim 3, wherein the marking value is embedded multiple times in each component image, whereby a majority voting process may be employed to decode the respective component images.

7. A method as recited in claim 3, wherein the marking value is embedded using error correction encoding, and wherein error correction decoding is employed to extract the marking values.

8. A method as recited in claim 7, wherein the error correction encoding comprises embedding of the marking value multiple times and the decoding comprises the use of majority voting.

9. A method as recited in claim 3, wherein the marked image is decodable to determine whether it has been altered and, if so, where in the image such alterations were made.

10. A method as recited in claim 3, further comprising the step of storing the marked image in a lossy-compression form.

11. A method as recited in claim 3, wherein the method is used in a digital camera or camcorder.

12. A method for applying a digital watermark to an image, comprising the steps of:
(A) deriving from the image a plurality of component images, wherein each component image contains coefficients;
(B) providing at least one look-up table containing a plurality of coefficients and corresponding values, wherein at least some of the look-up table coefficients match coefficients in said component images;
(C) shuffling the coefficients; and
(D) embedding said watermark in said image by performing the following substeps for at least some of said component images: (1) selecting a coefficient into which a marking value, representative of a corresponding portion of the watermark, is to be embedded; (2) using the value of the selected coefficient to identify a corresponding value in said look-up table(s); (3) leaving the selected coefficient unchanged if the corresponding value is the same as the marking value; and (4) changing the selected coefficient if the corresponding value is different from the marking value;

wherein the image is divided into a plurality of component images of n×m pixels, wherein n and m are integers, and wherein each component image is transformed using the discrete cosine transform (DCT) into n×m transform coefficients; wherein the corresponding values in said look-up table(s) are binary-valued and are constrained to have a prescribed maximum run length of either binary value; wherein, in the embedding substep (C)(4), the selected coefficient is changed minimally to a value having a corresponding value in the look-up table(s) whose value is the same as the marking value, wherein the selected coefficient is changed minimally by changing its value to that of the nearest coefficient having a corresponding look-up table value equal to the marking value; and further comprising the step of identifying selected coefficients as being unembeddable, wherein said unembeddable coefficients are not employed in step (C) to embed marking values; wherein some of said coefficients are identified as DC coefficients that are considered unembeddable; and wherein coefficients having values below threshold values are considered unembeddable.

13. A method for applying a digital watermark to an image, comprising the steps of:
(A) deriving from the image a plurality of component images, wherein each component image contains coefficients;
(B) providing at least one look-up table containing a plurality of coefficients and corresponding values, wherein at least some of the look-up table coefficients match coefficients in said component images;
(C) shuffling the coefficients prior to said embedding step; and
(D) embedding said watermark in said image by performing the following substeps for at least some of said component images: (1) selecting a coefficient into which a marking value, representative of a corresponding portion of the watermark, is to be embedded; (2) using the value of the selected coefficient to identify a corresponding value in said look-up table(s); (3) leaving the selected coefficient unchanged if the corresponding value is the same as the marking value; and (4) changing the selected coefficient if the corresponding value is different from the marking value.

wherein the image is divided into a plurality of component images of size n×m pixels, wherein n and m are integers, and wherein each component image is transformed into coefficients;

further comprising the step of shuffling the coefficients prior to said embedding step;

wherein said shuffling step comprises concatenating the coefficients of a plurality of component images into a string and shuffling the order of the coefficients in said string; and wherein the shuffled string of coefficients are put into a plurality of sub-strings and each sub-string is used to embed one watermark or is to be used for error detection or for error correction.

14. A method for applying a digital watermark to an image, comprising the steps of:
   (A) deriving from the image a plurality of component images, wherein each component image contains coefficients;
   (B) providing at least one look-up table containing a plurality of coefficients and corresponding values, wherein at least some of the look-up table coefficients match coefficients in said component images;
   (C) shuffling the coefficients prior to said embedding step; and
   (D) embedding said watermark in said image by performing the following substeps for at least some of said component images: (1) selecting a coefficient into which a marking value, representative of a corresponding portion of the watermark, is to be embedded; (2) using the value of the selected coefficient to identify a corresponding value in said look-up table(s); (3) leaving the selected coefficient unchanged if the corresponding value is the same as the marking value; and (4) changing the selected coefficient if the corresponding value is different from the marking value.

wherein the image is divided into a plurality of component images of size n×m pixels, wherein n and m are integers, and wherein each component image is transformed into coefficients;

further comprising the step of shuffling the coefficients prior to said embedding step;

wherein said shuffling step comprises concatenating the coefficients of a plurality of component images into a string and shuffling the order of the coefficients in said string; and wherein the shuffled string of coefficients are put into a plurality of sub-strings and each sub-string is used to embed one watermark or is to be used for error detection or for error correction.

* * * * *

UNITED STATES PATENT AND TRADEMARK OFFICE
CERTIFICATE OF CORRECTION

PATENT NO.   : 6,285,775 B1          Page 1 of 1
DATED        : September 4, 2001
INVENTOR(S)  : Min Wu et al.

It is certified that error appears in the above-identified patent and that said Letters Patent is hereby corrected as shown below:

Column 2,
Line 18, delete "=" and insert -- " -- therefor.
Line 34, delete "waterinarking" and insert -- watermarking -- therefor.

Column 10,
Line 45, delete "arc" and insert -- are -- therefor.

Column 12,
Line 27, insert "to" after the word "attempt".
Line 49, delete "numbers" and insert -- number -- therefor.

Signed and Sealed this

Seventh Day of May, 2002

Attest:

JAMES E. ROGAN
Attesting Officer    Director of the United States Patent and Trademark Office